United States Patent
Salin

(10) Patent No.: US 6,501,948 B1
(45) Date of Patent: Dec. 31, 2002

(54) CALL FORWARDING IN A TELECOMMUNICATION SYSTEM

(75) Inventor: Hannu-Pekka Salin, Vantaa (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/528,796

(22) Filed: Mar. 16, 2000

Related U.S. Application Data

(63) Continuation of application No. PCT/FI98/00758, filed on Sep. 24, 1998.

(30) Foreign Application Priority Data

Sep. 26, 1997 (FI) .................................................. 973805

(51) Int. Cl.[7] .............................................. H04M 3/54
(52) U.S. Cl. .................. 455/417; 379/211.02; 455/445
(58) Field of Search ................................ 455/417, 433, 455/445, 414, 518, 519; 379/211.02

(56) References Cited

U.S. PATENT DOCUMENTS

| | | | | |
|---|---|---|---|---|
| 4,723,273 A | * | 2/1988 | Diesel et al. | 379/142.01 |
| 5,765,108 A | * | 6/1998 | Martin et al. | 455/414 |
| 5,850,603 A | * | 12/1998 | Lantto et al. | 455/414 |
| 6,006,091 A | * | 12/1999 | Lupien | 455/414 |
| 6,115,613 A | * | 9/2000 | Jonsson | 455/414 |

FOREIGN PATENT DOCUMENTS

| | | |
|---|---|---|
| FI | 97191 | 4/1996 |
| WO | 94/28670 | 12/1994 |
| WO | 97/27713 | 7/1997 |

OTHER PUBLICATIONS

"Modeling ISDN Supplementary Services Using Coloured Petri Nets" Findlow, et al., Communication Technology Services and Systems, pp. 37–41, Oct. 1992.

International Search Report for PCT/F198/00578, Apr. 1999.

European Telecommunications Standards Institute, "Digital cellular telecommunications system (Phase 2+ ); Closed User Group (CUG) Supplementary Services—Stage 1 (GSM 02.85 version 6.0.0 Release 1997)", Jan. 1999.

* cited by examiner

Primary Examiner—Thanh Cong Le
Assistant Examiner—Nick Corsaro
(74) Attorney, Agent, or Firm—Altera Law Group, LLC

(57) ABSTRACT

The inventive idea is to set up by parts of forwarded call using services of a closed user group always leg-specifically. Hereby the user group data defined by the subscribers for the leg in question can be used for each leg. The user group data defined by the calling subscriber is used in that leg of the call which is between the calling subscriber and the call forwarding point. User group data defined by the called subscriber who forwarded the call is used between the forwarding point and the subscriber who is the forwarding target.

10 Claims, 7 Drawing Sheets

| CF NUMBER |
|---|
| IC(A) |
| OA(A) |
| SEPARATOR |
| CUG-CHECK-INFO |
| IC(B) |
| OA(B) |

FIG. 10.

| SERVICE ID |
|---|
| STATUS |
| FORWARDING NUMBER |
| TIME |
| CUG IC |
| OA |

FIG. 11.

CALL FORWARDING IN A TELECOMMUNICATION SYSTEM

This is a continuation of PCT/FI98/00758 filed Sep. 24, 1998.

FIELD OF THE INVENTION

This invention relates to set-up of forwarded calls in a system wherein closed user groups are defined.

BACKGROUND OF THE INVENTION

It is known in telecommunication systems to define closed user groups (CUG), e.g. defined by the staff of a company or by a certain circle of friends. The services of a closed user group may be different and e.g. cheaper than normal calls.

The use of a closed user group in a telecommunication system is described in the GSM 02.85 specification published by the ETSI (European Telecommunications Standards Institute). In accordance with the specification, a subscriber belonging to a closed user group may have various subscriber options defined for himself which tell what kinds of calls the subscriber may receive or make. These subscriber options are 1. CUG calls only; the subscriber may set up calls only with subscribers of his own CUG group,
2. Access for CUG and incoming calls; the subscriber may set up calls with subscribers of his own CUG group and also receive calls coming from outside his own CUG group (IA, Incoming Access),
3. Access for CUG and outgoing calls; the subscriber may set up calls with subscribers of his own CUG group and may also make calls going outside his own CUG group (OA, Outgoing Access), and
4. Access for CUG and outgoing and incoming calls; the subscriber may set up calls with subscribers of his own CUG group and may also make calls going outside his own CUG group and receive calls coming from outside his own CUG group (IA+O Å).

In addition, restrictions within the user group may be defined for he subscriber, 1. ICB, incoming calls barred within a CUG, and
2. OCB, outgoing calls barred within a CUG.

A subscriber may belong simultaneously to several closed user groups CUG, of which one may be selected as default group, which is used in the set-up of outgoing calls, unless otherwise mentioned for the individual call.

FIG. 1 shows storing of information relating to closed user groups in a home location register HLR. A copy of the information presented in the figure is also preserved in the subscribers visitor location register VLR. An international mobile subscriber identity IMSI functions as the key to the record. A list of the basic services to which the subscriber has a right is appended to the subscriber identity. Services are distinguished from each other with the aid of basic service group codes BSGC. To the services is connected information on the closed user group CUG to be primarily used when setting up a call as well as information on OA access of outgoing calls outside the group. In the example shown in the figure, such a user group is defined for primary use in connection with speech service T11 for the subscriber, the CUG INDEX of which =1, and there is also access for outgoing calls going outside the group (OA=T). Correspondingly, in connection with fax service T62 of group 3, such a user group is used primarily, the CUG INDEX of which =2, and outgoing calls going outside the group are barred (OA=F). In connection with the PAD service (Packet Assembler/Disassembler) BA6 to be used when connecting to packet data networks at a transmission rate of 9600 bits a second, such a user group is used primarily, the CUG INDEX of which =4, and outgoing calls going outside the group are barred (OA=F).

In addition to service information and primary CUGs relating to services, the visitor location register stores a description of network-specific CUG IC (CUG Interlock Code) group attributes which are used between subscriber-specific CUG INDEX group attributes and exchanges. In the example shown in the figure, the CUG INDEX 1 of the subscriber's user group corresponds to the network-specific CUG IC 101 symbol, while CUG INDEX 2 corresponds to CUG IC 12, CUG INDEX 3 to CUG IC 1 and CUG INDEX 4 to CUG IC 14.

FIG. 2 shows transmission of information relating to the use of a closed user group when setting up a call. In the example, a call is set up between two mobile stations MSA and MSB (MS=Mobile Station). According to the figure, the CUG user group which is to be used is distinguished between the calling mobile station MSA and the mobile switching centre MSC and a visitor location register VLR typically located in connection with the MSC, using subscriber-specific CUG INDEX information together with the subscriber identity. If in connection with the call set-up, the MSA does not separately state any CUG to be used, then that closed user group will be used which has been defined by the subscriber as the default group for this basic service. If no default group has been defined for the basic service and the subscriber does not in connection with the call set-up indicate any closed user group to be used, the call will be set up as a normal call, if the subscriber has given access to normal calls (OA).

Upon receiving the request for a call set-up, the MSC/VLR checks if the MSA has the right to set-up of the CUG call he requested. This is done with the aid of the CUG INDEX information obtained from the subscriber, with subscriber data stored in the visitor location register VLR and with a special authorisation function. The call set-up is continued, if it is found that the subscriber is so entitled.

A user group to be used in communication between mobile switching centres is identified within the user group's network by a CUG IC identifier performing unambiguous identification. in addition, in communication between exchanges the term OA is used, which tells whether the call is allowed to be an outgoing call going outside the CUG.

When setting up a call, the calling subscriber MSA's exchange MSC contacts the GMSCB gateway mobile services switching centre of subscriber B based on the MSISDN number (MSISDN=Mobile Subscriber ISDN) which identifies subscriber B. The GMSCB is a centre able to make SRI (Send Routing Information) enquiries to subscriber B's home location register HLRB. In the SRI, the GMSCB sends to the HLRB the IC(A) identifier of the CUG defined by subscriber A and information on access of outgoing calls going outside the group.

FIG. 3 shows the operation of home location register HLRB. The HLRB receives the SRI enquiry (step N01) and checks whether MSB belongs to the CUG defined by subscriber A by comparing the IC(B) group symbols of subscriber B with the IC(A) group data stated by subscriber A (step N02). If it is found that subscriber B belongs to the defined user group, then $IC(A) \in \{IC(B)\}$ is true, and the operation proceeds to step N03, where it is checked whether MSB has barred incoming calls within the group (ICB). If calls within the group are allowed (ICB(B) is false), a further check is made in step N04 to find out whether subscriber B has defined forwarding of the call. The call will be forwarded, if subscriber B has determined that his call is to be forwarded unconditionally to subscriber C (CFU, Call Forwarding Unconditional) or if HLR finds that the subscriber can not be reached and the subscriber has defined CFNRc (Call Forwarding on Not Reachable) to be made in such a case. If forwarding is not defined or the forwarding conditions are not met, the call set-up is continued as a CUG call (step N05). If the call is defined to be forwarded to a third subscriber (subscriber C), the CUG information (IC(A), OA(A)) is checked to find out whether forwarding of the call can be carried out (step N20).

If it is found in step N02 that subscriber B does not belong to the user group (IC(A)∉{IC(B)}) defined by subscriber A, or in step N03 that subscriber B has barred internal calls in the group, progress is made to steps N11 and N12, where it is checked whether the call can be set up as a normal call. A check is made in step N11 to find out whether subscriber A has allowed the call to go outside the group (OA(A)) and in step N12 whether subscriber B has allowed access for calls coming from outside the group (IA(B)). If each condition is fulfilled, it is checked whether the call must be forwarded to a third subscriber, that is, to subscriber C (step N13). If no forwarding is defined or if forwarding conditions are not fulfilled, the call is continued as a normal call (step N14). If forwarding of the call is defined, a check is made based on the CUG data (IC(A), OA(A)) given by subscriber A to find out whether forwarding of the call can be carried out (step N20).

If no condition of steps N11 and N12 is fulfilled, the call will be rejected (step N30).

If set-up of the call is continued without forwarding the call (steps N05 and N14), HLRB will use a PRN message (Provide Roaming Number) to request the MSRN roaming number (Mobile Subscriber Roaming Number) of subscriber B's current visitor location register VLRB. The roaming number is used to identify the called subscriber B during the call set-up. HLRB returns the roaming number it has received together with the CUG identifiers defined by subscriber A to GMSCB, which for its part sets up a connection with the MSB mobile station through VMSCB using the roaming number as identifier.

Should HLR find in step N04 or N13 of FIG. 3 that the call is defined to be forwarded to subscriber C, a check is made of whether forwarding is possible. This functionality is shown in FIG. 4. It is checked in step B02 if subscriber B belongs to the user group defined by subscriber A. If this is not the case, an instruction is returned to GMSCB to forward the call to subscriber C using the CUG parameters (IC(A), OA(A)) defined by subscriber A, if both subscriber A and subscriber B have defined access for outgoing calls outside their CUG groups (steps B21 and B22).

If subscriber B belongs to the CUG group defined by subscriber A, it is checked whether subscriber B has barred outgoing calls inside the group (step B03). If this is not the case, an instruction is given to GMSCB to forward the call to subscriber C as a CUG call. If both subscriber A and subscriber B have defined access for outgoing calls outside their CUG groups (steps B11 and B12), the forwarded call is also allowed to go outside the group (OA, step B23). If this is not the case, the call is forwarded as a CUG call without allowing the call to go outside the group (step B13).

If subscriber B has barred calls inside the group, progress is made from step B03 to steps B04 and B05, where GMSCB is controlled to forward the call as a normal call (step B06, normal call), if both subscriber A and subscriber B have defined access for outgoing calls outside their CUG groups. If at least one subscriber has barred outgoing calls going outside the group, the call is barred (step B30).

Thus, in the forwarding leg defined by subscriber B the CUG parameters defined by subscriber A are mainly used. Based on the CUG definitions of subscriber B, the CUG definitions of subscriber A can be changed only 1. to bar outgoing calls outside the CUG group of subscriber A, if subscriber B has barred his outgoing calls going outside his own group, and
2. to set up the call as a normal call, if subscriber B has barred calls inside the CUG group defined by subscriber A, but both subscriber A and subscriber B allow outgoing calls going outside the group in question.

Having received from HLRB an instruction to forward the call, GMSCB continues to set up the call towards subscriber C based on the CUG information it has received from HLRB. FIG. 5 shows routing of the call to be set up. The call is now formed by legs 1 and 2 between the GMSCB gateway centres of subscriber A and subscriber B and by the forwarding distance formed by legs 3, 4 and 5 between GMSCB and subscriber C. Forwarding takes place in GMSCB, which is called the forwarding point. If subscriber B or subscriber C is a fixed network subscriber, no enquiry is made to the home location register for his part, because the subscriber information is then stored in the exchange of his fixed network. If supplementary service information of the subscriber is stored in an IN (Intelligent Network) connected to his exchange, the exchange must fetch the said information through an enquiry to the intelligent network.

If the subscriber has defined call forwardings to be performed in VLR such as CFB (Call Forwarding on Busy), CFNRy (Call Forwarding on No Reply) or CFNRc (Call Forwarding on Not Reachable), and VLR finds that the condition for such call forwarding is fulfilled, VLR will make the checks shown above in FIG. 4 and will continue to set up the call towards subscriber C. The forwarding point will then be that VMSCB centre, see FIG. 2, under which subscriber B is operating at the moment.

In the processing of forwarded calls the usual charging principle is that subscriber A always pays for the leg between subscriber A and the call forwarding point, while subscriber B pays for the leg between the forwarding point and subscriber C. However, CUG information defined by subscriber A is used in that leg of the call which is between subscriber C and the forwarding point defined by and paid for by subscriber B. If subscriber B and subscriber C belong to the same CUG group, it would be most natural to set up the B-C forwarding leg as a CUG call which may have more advantageous characteristics and a more advantageous price than a normal call. E.g. in cases where a calling subscriber A does not belong to the same CUG user group as subscriber B and subscriber C, the call will be set up in accordance with FIG. 6 as a normal call both over the A-B distance and over the B-C distance.

FIG. 7 shows another situation, where problems are caused by a state-of-the-art arrangement. In the figure, subscriber A belongs to user group G2, subscriber B to user groups G1 and G2 and subscriber C to user group G1. Subscriber B has defined forwarding of his calls to subscriber C as CUG calls. When subscriber A makes a CUG call to subscriber B with no access (no OA) of outgoing calls outside the group, the home location register HLRB of subscriber B checks if subscriber B belongs to the G1 user group defined by subscriber A. Since this is the case, set-up of the call is continued from forwarding point GMSCB towards subscriber C with the CUG information provided by subscriber A. A check is made in the home location register HLRC of subscriber C to find out if subscriber C belongs to the CUG group G2 defined for the call. Since this is not the case and the call is not allowed to go outside the said G2 group, set-up of the call is discontinued.

Further, in state-of-the-art systems, the type of a call is not known before the CUG checks made by the final recipient of the call. If the calling subscriber defines a CUG group for use in the call and also allows the call to go outside the group, the MSCA centre of the calling subscriber or the GMSCB centre of the called subscriber does not know if the call should be set up as a CUG call or as a normal call. For this reason, statistics on the call and charging of the call must use the name "maybe CUG" for the call as regards the A-B distance.

For the reasons presented above, controlling of forwarded calls of a closed user group is difficult, especially the use of leg-based charging. The present invention aims at solving these problems. The aim is achieved with the method and equipment defined in the independent claims.

SUMMARY OF THE INVENTION

The inventive idea is to set up a forwarded call using a service of a closed user group always legspesifically. Hereby such user group information can be used for each leg which is defined by the subscriber explicitly for the concerned leg. The user group information defined by a calling subscriber A is used on that leg of the call which is between subscriber A and the call forwarding point. The user group information defined by the called subscriber who has forwarded the call is used between the forwarding point and the subscriber who is the forwarding target.

In one embodiment, the network element, such as a home location register, maintaining subscriber information of the subscriber who has activated a conditional or an unconditional call forwarding, is adapted in connection with the call set-up to return the user group information defined by the subscriber for the forwarding leg. In addition, the exchange or centre functioning as the call forwarding point is adapted to continue set-up of the call based on the user group information it has received for the forwarding leg towards the subscriber who is the forwarding target.

LIST OF FIGURES

The invention will be described more closely with reference to the appended drawings, wherein FIG. 1 shows subscriber information of a subscriber belonging to a closed user group;

FIG. 10 shows a message relaying call forwarding information for use in communications between telephone exchanges;

FIG. 11 shows the structure of a record for use in storing information of a supplementary service added to the subscriber information;

DETAILED DESCRIPTION OF THE INVENTION

Figures 1, 2:
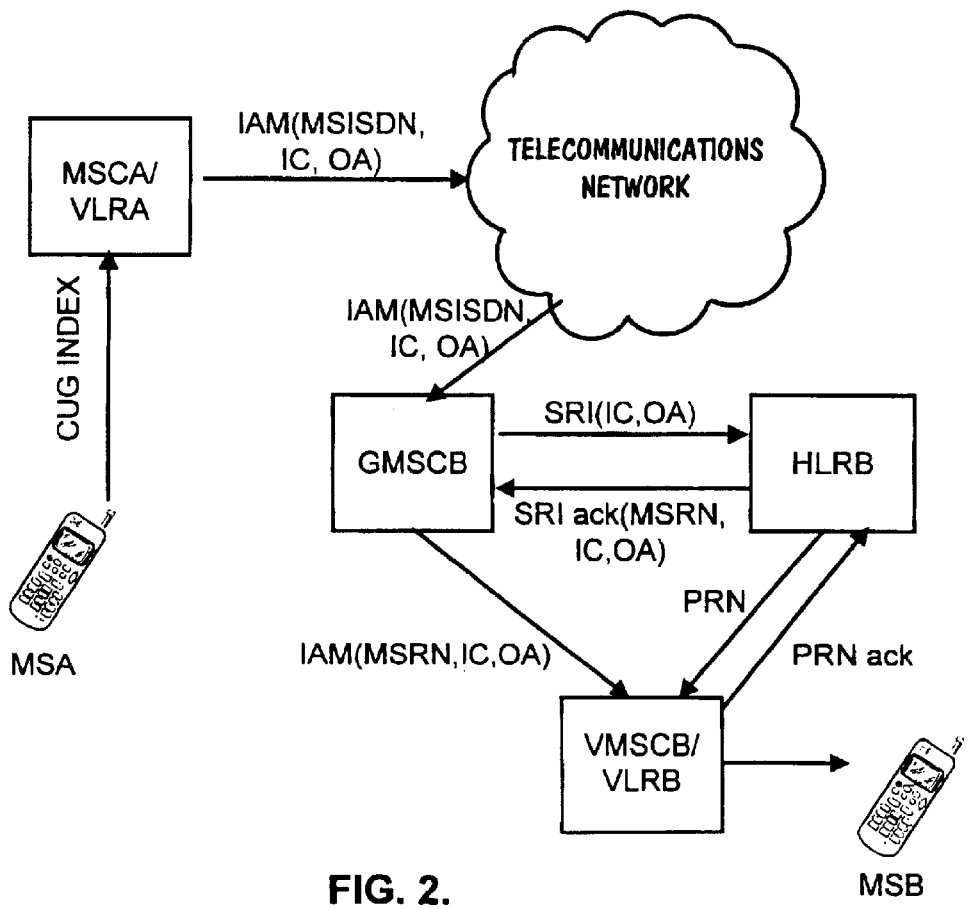
FIG. 2 shows signalling of a call set-up using a service of a closed user group.
Figure 3:
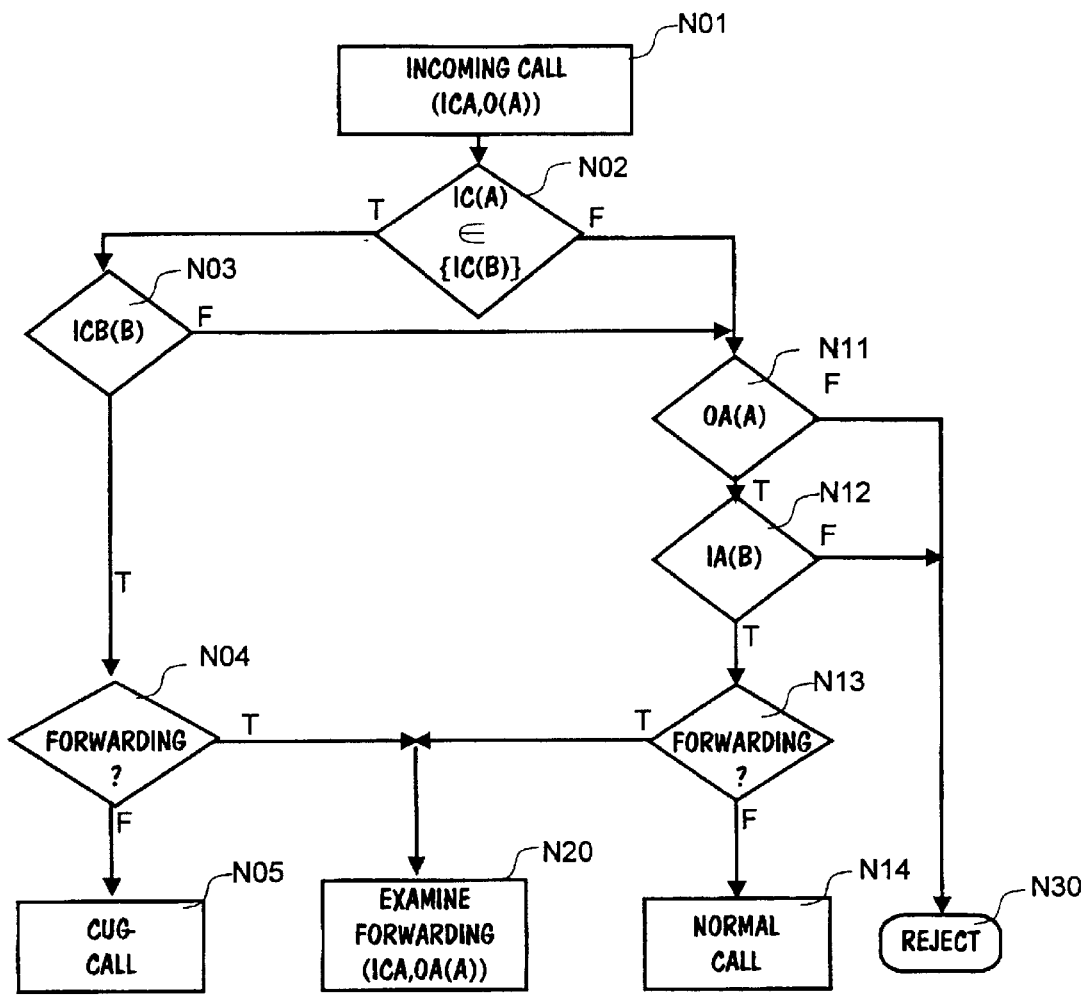
FIG. 3 shows a user group check to be made on a received call.
Figure 4:
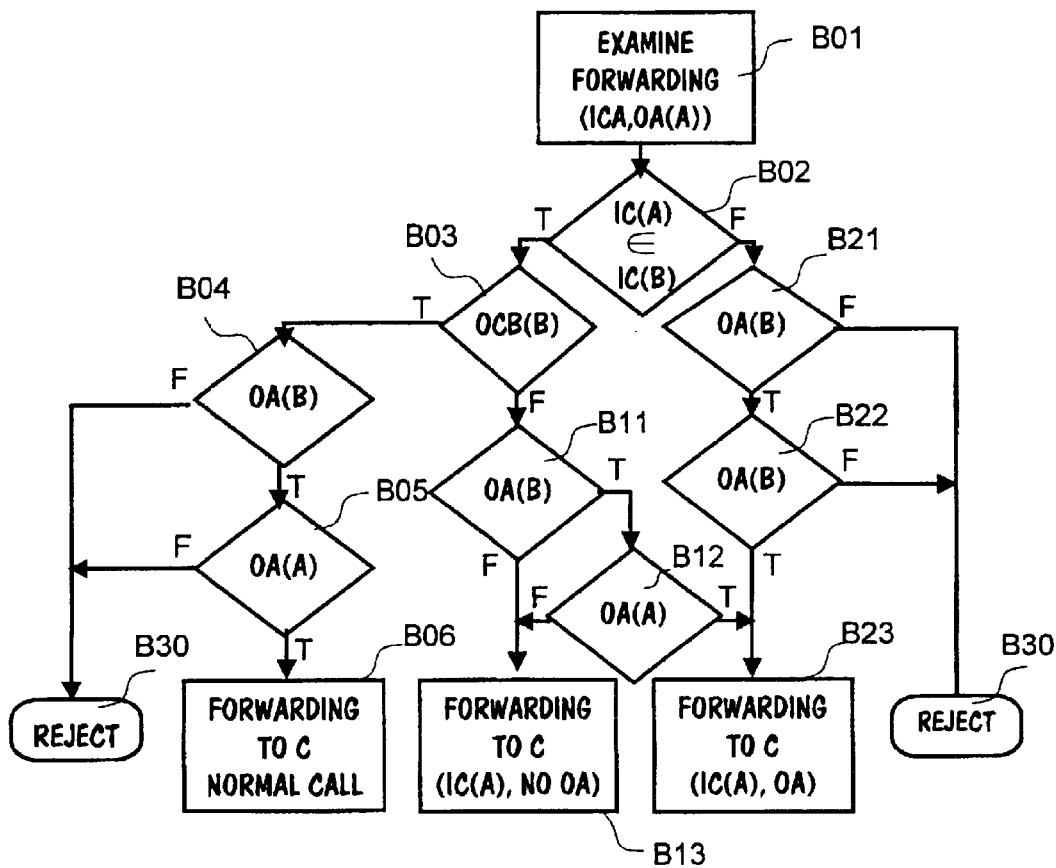
FIG. 4 shows a state-of-the-art user group check to be made on a forwarded call.
Figure 5:
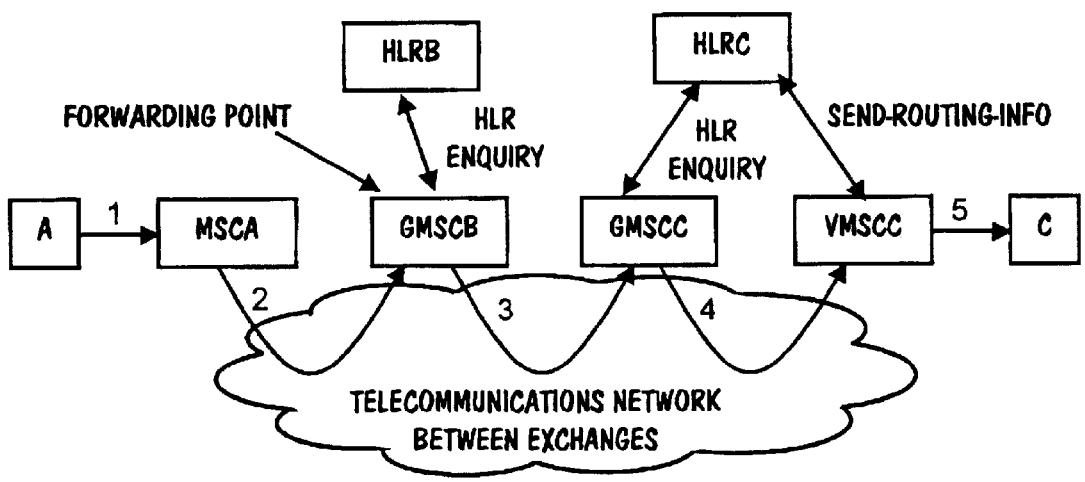
FIG. 5 shows routing of a forwarded call.
Figure 6:
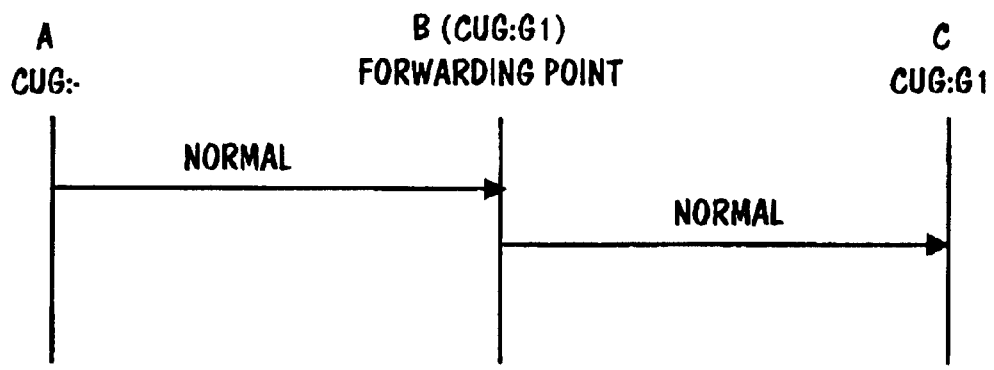
FIG. 6 shows a state-of-the-art call set-up of a forwarded call.
Figure 7:
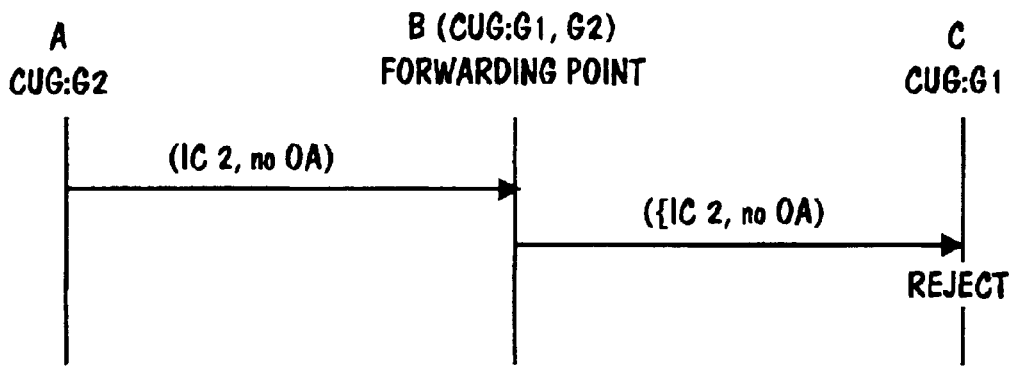
FIG. 7 shows a state-of-the-art call set-up of a forwarded call.
Figure 8:
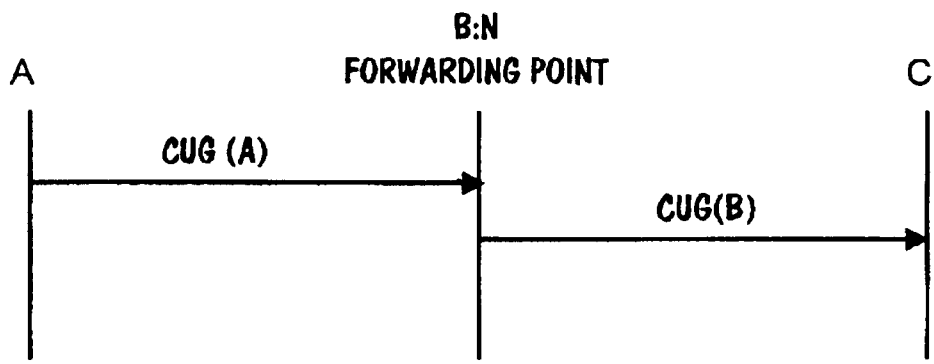
FIG. 8 shows a call set-up of a forwarded call in accordance with the invention.

The main principle of the invention is shown in FIG. 7. The figure shows a situation where subscriber A makes a call to subscriber B for which he has provided CUG(A) user group definitions. The user group definitions include the CUG IC user group identifier of the call and information on access for outgoing calls going outside the user group (OA). The call is set up between subscriber A and the forwarding point forwarding the call from subscriber B to subscriber C in accordance with the user group attributes provided by subscriber A. The CUG(B) user group definitions defined by subscriber B for the B-C forwarding leg are fetched in the forwarding point. A connection is set up in accordance with these attributes between the forwarding point and subscriber C who is the forwarding target.

The set-up of a forwarded call in accordance with the invention proceeds in a state-of-the-art fashion to the GMSCB gateway centre of subscriber B until the send routing enquiry made to the subscriber's home location register HLRB.

Figure 9:
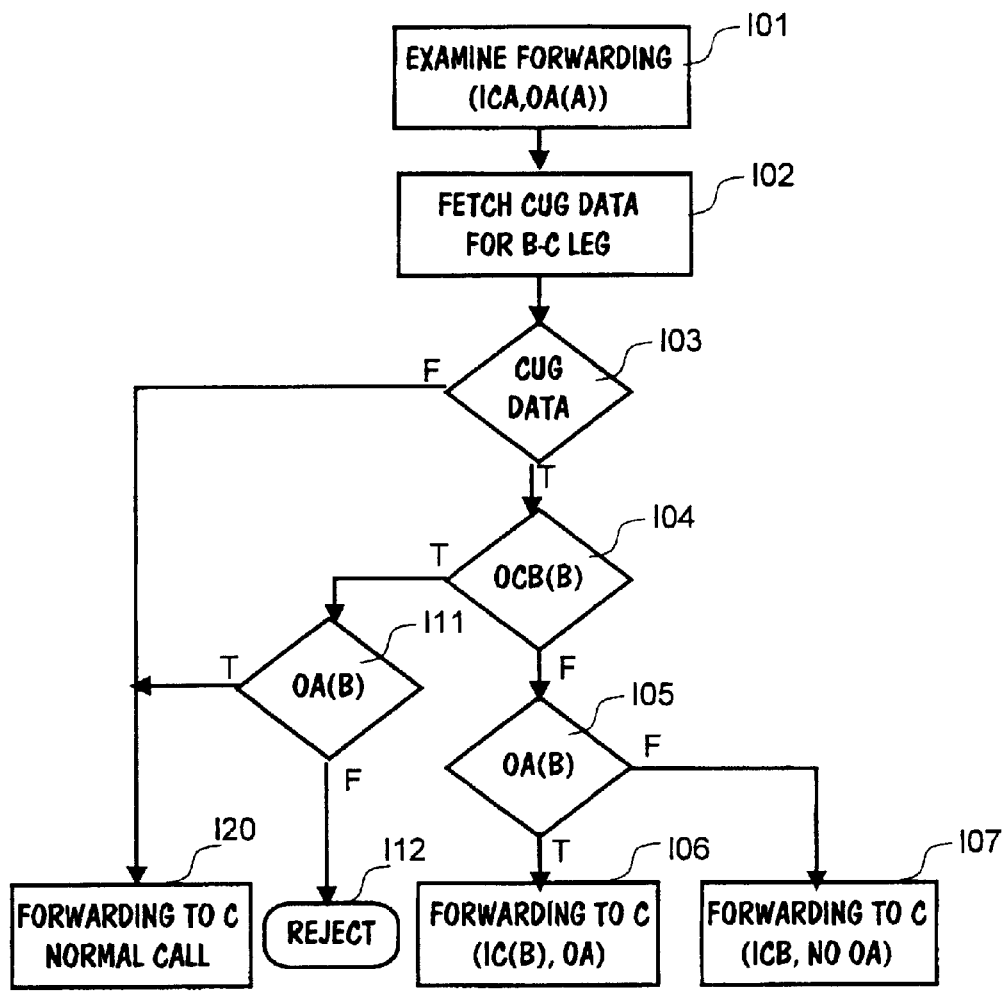
FIG. 9 shows a functionality in accordance with the invention to be carried out in the call set-up of a forwarded call.

FIG. 9 shows an example of an algorithm performing a call forwarding function in accordance with the invention in a home location register HLR of a mobile communications network. On finding that the call must be forwarded to subscriber C (step I01) the HLR fetches from its stored subscriber information the CUG information defined by subscriber B for the forwarding leg B-C (step I02). If there is no CUG information in the forwarding information, information is returned to the exchange which made the enquiry stating that the call ought to be forwarded to subscriber C as a normal call (step I20).

If CUG information is defined for the forwarding leg, a check is made to find out if subscriber B has defined barring of outgoing calls inside the user group (step I04). If calls inside the user group are barred, a check is made in step I11 if subscriber B has defined access for outgoing calls going outside the group. If there is access for calls going outside the group, information is returned to the exchange which made the enquiry to state that the call should be forwarded to subscriber C as a normal call (step I20). If in addition to calls inside the group, outgoing calls going outside the group are also barred, the set-up of the call is discontinued (step I12).

If there is access for calls inside the user group, the call set-up is controlled in accordance with the invention to continue based on the user group information defined by subscriber B for the forwarding leg. It is checked in step I05 if subscriber B has defined access for outgoing calls going outside the group. If this is the case, information is returned to the exchange which made the enquiry to state that the call must be forwarded to subscriber C using the closed user group service defined by subscriber B and with access for outgoing calls going outside the group (step I06, IC(B), OA). If subscriber B has defined that outgoing calls going outside the group shall be barred, information is returned to the exchange which made the enquiry to state that the call is to be forwarded to subscriber C using the closed user group service defined by subscriber B and barring outgoing calls going outside the group (step 107, IC(B), NO OA).

The GMSCB which made the enquiry and which forms the call forwarding point goes on setting up the call towards subscriber C based on the CUG parameters for the forwarding leg which it has received from the HLRB of the subscriber forwarding the call. Based on the parameters it also keeps statistics on the leg between subscriber A and the forwarding point as a CUG call or as a normal call.

The algorithm described above and shown in FIG. 9 must also be implemented in the visitor location register VLR. Hereby it is possible also in call forwardings CFB, CFNRc and CFNRy started by the visitor location register VLR to use call forwardings using leg-specific user group information in accordance with the invention.

If subscriber B is a fixed network subscriber, his subscriber information is stored in a fixed network exchange. Hereby the algorithm which was described above as performed in the home location register HLR must be placed in that exchange where the subscriber's subscriber information is stored.

The following is a study of examples of a message format suitable for use in relaying information needed by the functionality in accordance with the invention, of the structure of service records to be maintained in the subscriber's registers and of a method for changing subscriber information.

FIG. 10 shows a message relaying call forwarding information for use in communications between telephone exchanges. The message includes CF NUMBER, IC(A) and OA(A) fields for use in relaying state-of-the-art information relating to forwarding of calls. The CF NUMBER field contains subscriber C's number, and the IC(A) field contains the closed user group defined by subscriber A for use in the call. The OA(A) field contains information on whether subscriber A has defined access for outgoing calls going outside the group.

In addition to the fields mentioned above, there is a so-called extension part in the message where e.g. manufacturer-specific information may be transmitted. A separator field separates the extension part from the basic part of the message. The extension part may be used for transmitting such user group information in accordance with the invention which subscriber B has defined for the B-C forwarding leg. In this advantageous embodiment of the invention, an identifier field CUG-CHECK-INFO is placed after the separator field to define the significance of following fields. New information to be transmitted in accordance with the invention is transmitted in the following fields IC(B) (closed user group to be used in the forwarding leg) and OA(B) (information defined by subscriber B on access for outgoing calls going outside the group IC(B)). In addition, MATCH information is transmitted in the extension part on whether subscriber B belonged to the user group defined by subscriber A for use in the call set-up. With the aid of this information correct statistics may also be kept on the leg between subscriber A and the forwarding point as either a CUG call or a normal call.

FIG. 11 shows the structure of a supplementary service record containing CUG information defined by the user. The record is a part of the subscriber information stored in the user's home location register and/or in the visitor location register. The key to the record is SERVICEID, which identifies the supplementary service in question. STATUS information is defined for each supplementary service used by the subscriber, that is, information on whether the supplementary service is activated or deactivated. The contents of fields of the record depend on the supplementary service in question and on the parameters it requires.

Supplementary services which are typical from the point of view of this invention are various forwarding services, such as call forwarding unconditional CFU, call forwarding on no reply CFNRy, call forwarding on not reachable CFNRc and call forwarding on busy CFB. The FORWARDING NUMBER of subscriber C who is the forwarding target must be stored in the service record for all forwarding services. Of the forwarding services, the call forwarding on no reply may include a delay time chosen by the subscriber, that is, the time after which the call forwarding on no reply is carried out. This delay time is stored in the TIME field of the service record. In the service records of other forwarding services CFU, CFNRc and CFB there is no TIME field or it is without significance.

In addition to the already state-of-the-art information described above, the service record in accordance with the invention contains CUG IC and OA fields containing information on the closed user group for use in the forwarding service and on a possible access for outgoing calls going outside the user group.

The user may be given several different possibilities of changing the information of the service record described above. The simplest solution is to define fixedly a user group for use in the forwarding and a possible access for outgoing calls going outside the group when introducing the supplementary service. Hereby the operator supplies the said information to the subscriber's subscriber information. When the subscriber wishes to change the information, he must get in touch with the operator. When activating a supplementary service, the subscriber supplies in a state-of-the-art fashion only the number of subscriber C who is the forwarding target and a delay time, if any. However, since the subscriber wishes to forward his call to different numbers in different situations, this quite fixed definition of a closed user group for use in the B-C forwarding part is not the best possible solution.

It is known from the fixed network ISDN technology and from mobile communications systems such as the GSM system that the subscriber may use his mobile station for changing his service information, such as call forwarding. In a GSM system, the messages to use for changes in supplementary services are 1. RegisterSS (Register Supplementary Service), which the subscriber may use to register himself as a user of the supplementary service and to create a service record concerning the service from his subscriber information,
2. to activate a supplementary service, that is, to activate the status information stored in the service record of the service,
3. EraseSS (Erase Supplementary Service), which the subscriber may use to erase a supplementary service, that is, to erase from his subscriber information the service record concerning the service,
4. DeactivateSS (Deactivate Supplementary Service), which the subscriber may use to deactivate a supplementary service, that is, to deactivate the status information stored in the service record of the service, and
5. InterrogateSS (interrogate Supplementary Service), which the subscriber may use to interrogate about the status of his supplementary services from the service records stored in his subscriber information.

Messages of the same type may also be used for the registration, activation, erasing, deactivation and status enquiry of forwarding services in accordance with the invention taking better account of closed user groups. However, for this purpose such fields must be added to messages which are needed in the forwarding of information defining the closed user group CUG to be used in forwarding and defining access for outgoing calls going outside the group.

Another alternative way of changing supplementary service data in accordance with the invention is to use a message of the USSD type (USSD=Unstructured Supplementary Service Data). As indicated by their name, USSD messages are used to transmit data which must be transmitted in character string form. For such data transmission to succeed, both the sender and the recipient must know the meaning of the characters in the character string.

Figure 12:
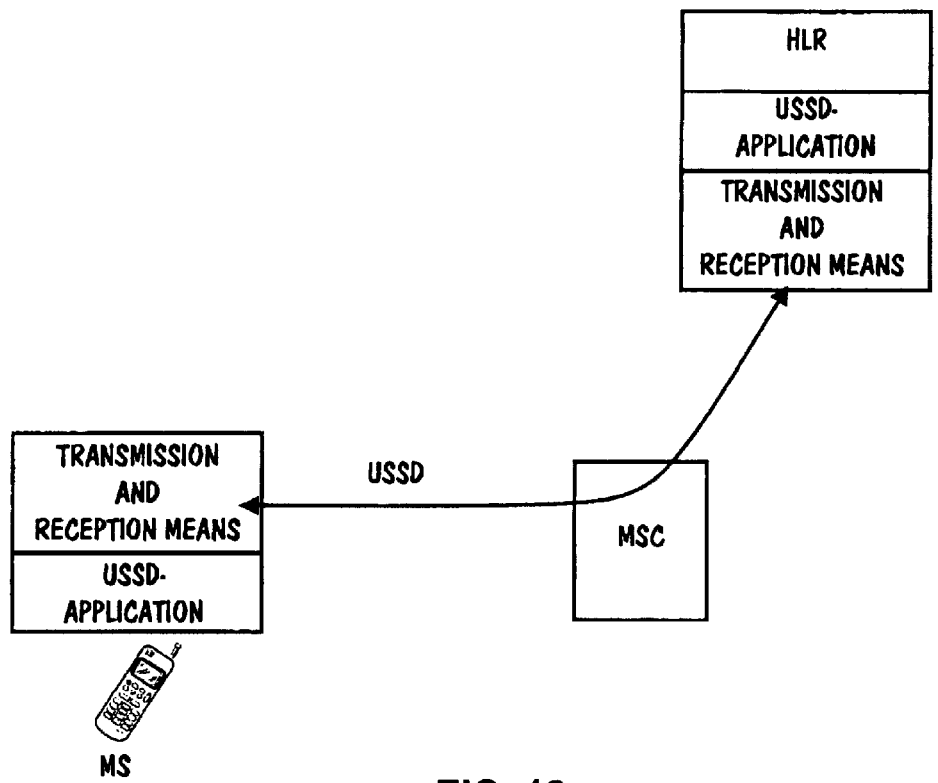
FIG. 12 shows a procedure for converting the contents of a record for use in storing information of a supplementary service added to the subscriber information.

FIG. 12 shows the use of USSD in editing of the subscribers forwarding service data in accordance with the invention. The mobile station MS is implemented with a USSD application which converts e.g. from a supplementary service editing instruction formed by the user with the telephone's display menu into a character string in accordance with a format agreed upon in advance, which character string is sent by a transmission means to the network as a USSD message. Alternatively, the subscriber may also input the character string directly from the keyboard of his telephone. The mobile station sends the USSD message to the network. The network routes the message to the subscriber's home location register HLR, which receives the message with its reception means. The home location register is implemented with a USSD application which decrypts the character string of the message, which message has a format agreed upon in advance, into values of variables of the supplementary service, such as the service code, forwarding number, delay time, if any, the identifier of the closed user group used in the forwarding leg and a possible variable defining access for outgoing call forwarding going outside the group.

In addition, after editing the service record or after the subscriber has made an enquiry about the contents of the service record, the HLR may use its transmission means to send to the mobile station an acknowledgement message included in the USSD message. Like the editing message, the acknowledgement message is also essentially a string of characters, which the mobile station user can interpret directly or which is interpreted for him in plain language by the USSD application implemented in the mobile station.

Figure 13:
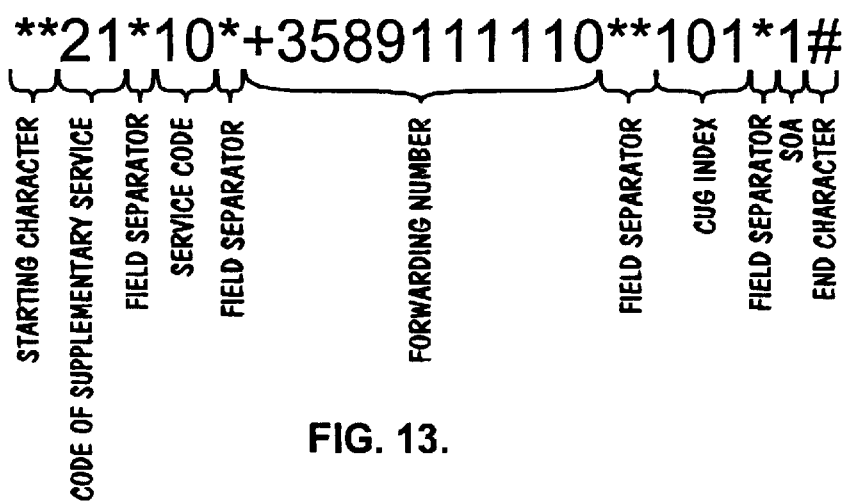
FIG. 13 shows an example of the structure of a message for use in changing the state of the supplementary service.

FIG. 13 shows an example of a character string format for use in the editing of supplementary service data to be made with the aid of a USSD message. In the format shown in the figure, two asterisks (*) are used as the first character. After the first character comes the supplementary service code, which in the example shown in the figure is code 21 meaning call forwarding. The supplementary service code is followed by a field separator consisting of one asterisk, which is followed by a service number. Number code 10 in the example refers to the subscriber's basic service. The service, code is followed by another separation character (*) and this is followed by a forwarding number, that is, the number of subscriber C. The forwarding number is followed by a field separator consisting of two asterisks and this is followed by the CUG INDEX identifier of the closed user group used by the subscriber, by a separation character (*) and by a SOA term (Suppress Outgoing Access) indicating suppression of outgoing calls going outside the closed user group. The string of characters ends at a stop character consisting of a square (#).

Although the invention was described above by way of examples placed in a mobile communications system, the invention is not limited to these. As was mentioned above, the invention can also be used in fixed network systems. The analyses relating to forwarding which are to be made in the subscriber's home location register in the mobile communications system of the examples are hereby done in an exchange of the subscriber's fixed network. Tasks may also be divided between a fixed network exchange and an intelligent network connected to it so that the fixed network exchange perceives the need for call forwarding and asks the intelligent network for the user group parameters defined by the subscriber for use in the forwarding leg. On receiving the parameters the exchange continues the call set-up with these parameters towards the subscriber who is the forwarding target. The functionalities in accordance with the invention may also be divided in the same way between exchange and intelligent network in a mobile communications system.

What is claimed is:

1. Method of setting up a forwarded call in a telecommunication system where at least some subscribers belong to closed user groups, where calls between the subscribers differ from calls made outside the group as regards the way in which their calls are set up, the subscriber may order that when conditions established by the subscriber are fulfilled his call shall be forwarded to another subscriber who is the forwarding target, in the call set-up the connection is first set up between the calling subscriber and the exchange of the called subscriber using user group information defined by the calling subscriber, where the exchange of the called subscriber is an exchange having access to the subscriber's subscriber data, characterized in that the subscriber defines user group data of the forwarding for use in the forwarding leg between his own exchange and the subscriber who is forwarding target, and when the subscriber is a called subscriber and the conditions are fulfilled which the subscriber has established for call forwarding:

the called subscriber's user group data of forwarding are fetched, and a connection is set up in the forwarding leg between the exchange of the called subscriber and the subscriber who is forwarding target using the user group data defined by the called subscriber for the forwarding leg.

2. Method as defined in claim 1 in a mobile communications system including subscribers, a subscriber home location register where the subscriber's subscriber data is maintained, such as data about call forwardings defined by the subscriber, and at least one gateway switching centre adapted to request routing data from the subscriber's home location register, characterized in that information is maintained in the subscriber's home location register about user group data of forwarding defined by the subscriber, a call is set up between the subscriber and the called subscriber's gateway mobile services switching centre using the user group data of forwarding defined by the called subscriber, Send_Routing_Info is sent from the gateway switching centre to the home location register, fulfilment of the conditions established for call forwarding as a response to reception of Send_Routing_Info is observed in the home location register, in response to fulfilment of the conditions, information is returned from the home location register to the gateway switching centre about forwarding of the call and about the user group data of forwarding defined by the called subscriber, and a connection is set up from the gateway switching centre to the subscriber who is forwarding target using the user group data of forwarding defined by the called subscriber.

3. Method as defined in claim 2, characterized in that the subscriber may change the information maintained in his home location register about call forwardings defined by the subscriber by messages which he sends which are known as such and which are in accordance with the specifications of the mobile communications system.

4. Method as defined in claim 2, characterized in that the home location register returns to the mobile switching centre the user group data defined for the forwarding leg in such a response extension part of a Send_Routing_Info message which is known as such and which is in accordance with the specifications of the mobile communications system.

5. Method as defined in claim 1 in a mobile communications system including subscribers, at least one mobile switching centre and a subscriber's visitor location register where the subscriber's subscriber data is maintained, such as data about call forwardings defined by the subscriber, characterized in that data is maintained in the subscribers visitor location register about user group data of forwarding defined by the subscriber, a call is set up between the calling subscriber and the called subscriber's current mobile switching centre using the user group data defined by the called subscriber, fulfilment of the conditions established for forwarding of the call is observed, in response to fulfilment of the conditions, the user group data of forwarding defined by the called subscriber is fetched from the visitor location register, and a connection is set up from the subscriber's current mobile switching centre to the subscriber who is forwarding target using the user group data of forwarding defined by the called subscriber.

6. Method as defined in claim 1 in a fixed telephone network including subscribers and at least one exchange of the fixed telephone network maintaining information about call forwardings defined by the subscriber, characterized in that information is maintained in the subscriber's exchange in the fixed telephone network about user group data of forwarding defined by the subscriber, a call is set up between the calling subscriber and the called subscriber's exchange in the fixed telephone network using the user group data defined by the called subscriber, fulfilment of the conditions established for call forwarding is observed in the called subscriber's exchange and in response to fulfilment of the conditions the user group data of forwarding defined by the subscriber is fetched, a connection is set up from the called subscriber's exchange to the subscriber who is forwarding target using the user group data of forwarding defined by the called subscriber.

7. Home location register in a mobile communications system including mobile switching centres, a home location register and subscribers at least some of which belong to closed user groups, where calls between the subscribers differ from calls made outside the user group as regards the way in which their calls are set up, in which system the subscriber may define that when conditions established by the subscriber are fulfilled his call shall be forwarded to another subscriber who is the forwarding target, which home location register is adapted to maintain information about call forwardings defined by the subscriber and to observe the fulfilment of the conditions established for call forwarding in response to reception of Send_Routing_Info received from the mobile switching centre, characterized in that the home location register is also adapted to maintain information about user group data of forwarding defined by the subscriber for use in the forwarding leg, to return in response to fulfilment of the conditions information to the mobile switching centre about forwarding of the call and about the user group data of forwarding defined by the called subscriber.

8. Home location register as defined in claim 7, characterized in that the home location register is adapted to return the user group data defined by the called subscriber for the forwarding leg in such a response extension part of the Send_Routing_Info message which is known as such and which is in accordance with the specifications of the mobile communications system.

9. Home location register as defined in claim 7, characterized in that the home location register is adapted to receive and interpret instructions sent by the subscriber in a message which is known as such and which is in accordance with the specifications of the mobile communications system, which instructions concern forwarding definitions, such as changing of call forwarding and of the user group data of forwarding, and change the call forwarding definitions of the subscriber in accordance with the received instructions.

10. Mobile switching centre in a mobile communications system including mobile switching centres, a home location register and subscribers at least some of which belong to closed user groups, where calls between the subscribers differ from calls made outside the user group as regards the way in which their calls are set up, in which system the subscriber may order that when conditions established by the subscriber are fulfilled his call is to be forwarded to another subscriber who is the forwarding target, which mobile switching centre is adapted to send Send_Routing_Info enquiries to the home location register, characterized in that the mobile switching centre is also adapted in response to a message received in the routing info reply concerning forwarding of the call to read from a supplementary part of the routing info reply the user group data of forwarding defined by the called subscriber for the forwarding leg between the mobile switching centre and the subscriber who is the forwarding target, and to set up a connection with the subscriber who is forwarding target based on the user group data of forwarding which it has read from the supplementary part.

* * * * *